United States Patent
Sun

(10) Patent No.: US 7,184,226 B2
(45) Date of Patent: Feb. 27, 2007

(54) HYBRID LENS SYSTEM AND MOBILE PHONE EMPLOYING THE SAME

(75) Inventor: Wen-Hsin Sun, Tu-cheng (TW)

(73) Assignee: Hon Hai Precision Industry Co., Ltd. (TW)

( * ) Notice: Subject to any disclaimer, the term of this patent is extended or adjusted under 35 U.S.C. 154(b) by 2 days.

(21) Appl. No.: 11/321,193

(22) Filed: Dec. 29, 2005

(65) Prior Publication Data

US 2006/0152824 A1    Jul. 13, 2006

(30) Foreign Application Priority Data

Jan. 7, 2005  (CN) .............. 2005 2 0053628 U

(51) Int. Cl.
   *G02B 9/14*    (2006.01)
(52) U.S. Cl. .................. 359/785; 359/784; 359/774
(58) Field of Classification Search .......... 359/785, 359/789, 784, 773, 774
See application file for complete search history.

(56) References Cited

U.S. PATENT DOCUMENTS

| 3,944,337 | A | * | 3/1976 | Ruben ................. 359/716 |
| 4,531,815 | A | * | 7/1985 | Konno et al. ......... 359/789 |
| 2004/0090685 | A1 | * | 5/2004 | Chen ................... 359/784 |
| 2004/0094825 | A1 | * | 5/2004 | Onishi et al. ......... 257/666 |
| 2004/0218285 | A1 | * | 11/2004 | Amanai ................ 359/773 |

* cited by examiner

*Primary Examiner*—Timothy Thompson
*Assistant Examiner*—Jerry Fang
(74) *Attorney, Agent, or Firm*—Morris Manning & Martin; Tim Tingkang Xia, Esq.

(57) ABSTRACT

A hybrid lens system includes, in order from an object side to an image side: a first positive lens, a second negative lens, and a third positive lens. The first lens is made of glass material. The second and second lenses are both made of plastic material and respectively have two aspheric surfaces. The hybrid lens system is capable of resisting scraping and providing high imaging quality.

13 Claims, 3 Drawing Sheets

HYBRID LENS SYSTEM AND MOBILE PHONE EMPLOYING THE SAME

BACKGROUND OF THE INVENTION

1. Field of the Invention

The present invention relates to hybrid lens systems, and more particularly to hybrid lens system typically incorporated in digital camera modules of mobile phones.

2. Description of Related Art

Conventionally, lens systems used in digital cameras are classified into three types: all-glass lens systems, all-plastic lens systems, and hybrid lens systems. When all-glass and all-plastic lens systems are used in digital camera modules of mobile phones, there are generally some shortcomings. The all-glass lens system is heavy and expensive, so that it is difficult to satisfy the requirements of low weight and low cost. The all-plastic lens system is light and cheap, but can be easily damaged by environmental factors such as high temperatures, scraping, etc.

A conventional hybrid lens system includes the following three lenses arranged in order from an object side to an image side: a front positive biconvex lens, a middle negative biconcave lens, and a rear positive biconvex lens. The front positive biconvex lens and the middle negative biconcave lens are made of inexpensive plastic material. The rear positive biconvex lens is made of glass material. Aberration correction at a high relative aperture is improved by the use of aspheric surfaces at selected faces of the front positive biconvex lens and the middle negative biconcave lens.

When used in small-sized mobile phones, the front positive biconvex lens is liable to be scraped by a user's fingers or other objects. Further, the front positive biconvex lens is liable to be deformed if exposed to high temperatures. Accordingly, the imaging quality of the conventional hybrid lens system may be significantly reduced.

Thus, what is needed is a hybrid lens system which is capable of resisting scraping and providing improved imaging quality. What is also needed is a mobile phone employing such a hybrid lens system.

SUMMARY

A hybrid lens system includes, in order from an abject side to an image side: a first positive lens, a second negative lens, and a third positive lens. The first lens is made of glass material. The second and third lenses are both made of plastic material and respectively have two aspheric surfaces. The hybrid lens system is capable of resisting scraping and providing high quality imaging.

A mobile phone includes circuitry for processing electric signals, a display screen for displaying images, a hybrid lens system as described above, and a housing receiving the circuitry, the display screen and the hybrid lens system therein.

BRIEF DESCRIPTION OF THE DRAWINGS

Many aspects of the hybrid lens system and mobile phone can be better understood with reference to the following drawings. The components in the drawings are not necessarily to scale, the emphasis instead being placed upon clearly illustrating the principles of the hybrid lens system and mobile phone.

Figure 1:
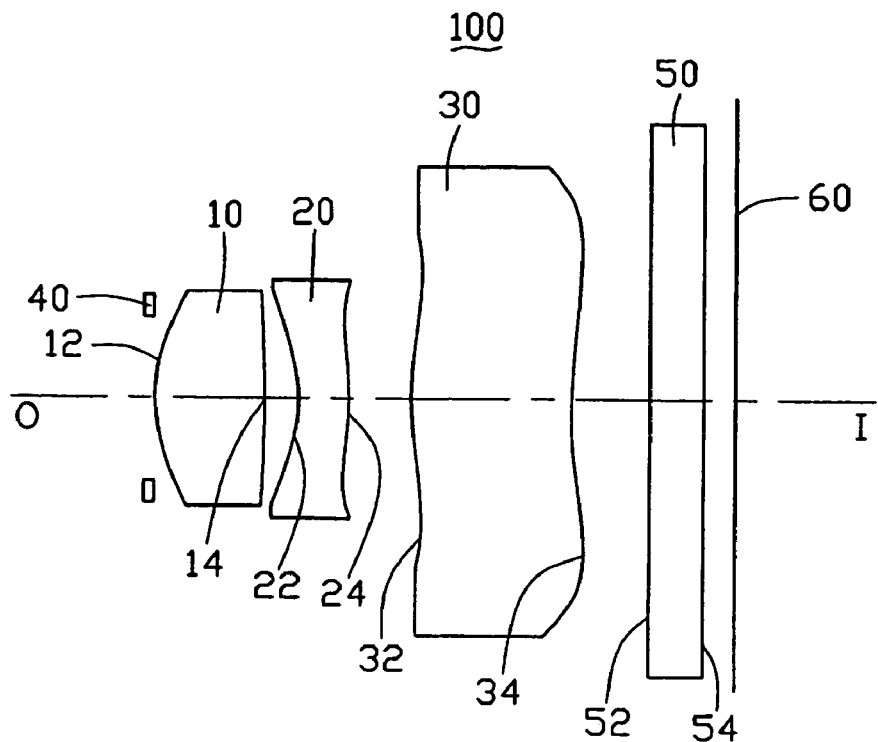
FIG. 1 is an enlarged, schematic view showing an arrangement of optical elements of a hybrid lens system according to a preferred embodiment of the present invention.

Corresponding reference characters indicate corresponding parts throughout the views. The exemplifications set out herein illustrate at least one preferred embodiment of the hybrid lens system and mobile phone, in one form, and such exemplifications are not to be construed as limiting the scope of the hybrid lens system or mobile phone in any manner.

DETAILED DESCRIPTION OF PREFERRED EMBODIMENT

Reference will now be made to the drawing figures to describe, at least, the preferred embodiment of the present hybrid lens system and mobile phone in detail.

Referring to FIG. 1, a hybrid lens system 100 according to a preferred embodiment is illustrated. The hybrid lens system 100 includes, in order from an object side (O) to an image side (I), a first lens 10, a second lens 20 and a third lens 30. The hybrid lens system 100 further includes a diaphragm 40, a transparent plate 50, and an imaging sensor 60. The diaphragm 40 is arranged at the object side (O) of the first lens 10. The transparent plate 50 and the imaging sensor 60 are arranged in order at the image side (I) of the third lens 30.

The first lens 10 is made of glass material. A refractive index $N_1$ and a dispersion index $V_1$ of the first lens 10 respectively fulfill the following conditions: $0.55 \leq N_1 \leq 0.65$ and $55 \leq V_1 \leq 65$. The first lens 10 has a positive focal length. The first lens 10 includes opposite first and second surfaces 12, 14. The first and second surfaces 12, 14 are both convex. The first surface 12 faces toward the object side (O), and the second surface 14 faces toward the image side (I). At least one of the first and second surfaces 12, 14 is selectively coated with an IR-Cut (Infrared-Cut) film in order to avoid IR light degrading the quality of images. In the preferred embodiment, the first and second surfaces 12, 14 are both spherical.

The second lens 20 is made of plastic material. A refractive index $N_2$ and a dispersion index $V_2$ of the second lens 20 respectively fulfill the following conditions: $0.58 \leq N_2 \leq 0.65$ and $25 \leq V_2 \leq 35$. The second lens 20 has a negative focal length. The second lens 20 includes opposite third and fourth surfaces 22, 24. The third surface 22 faces toward the object side (O) and is substantially concave. The fourth surface 24 faces toward the image side (I) and is convex.

The third lens 30 is also made of plastic material. A refractive index $N_3$ and a dispersion index $V_3$ of the third lens 30 respectively fulfill the following conditions: $0.49 \leq N_3 \leq 0.56$ and $55 \leq V_3 \leq 60$. The third lens 30 has a positive focal length. The third lens 30 includes opposite fifth and sixth surfaces 32, 34. The fifth surface 32 faces toward the object side (O) and is substantially convex. The sixth surface 34 faces toward the image side (I) and is substantially concave.

The diaphragm 40 is utilized to control apertures of the first, second and third lenses 10, 20 and 30 and a field of the hybrid lens system 100. The transparent plate 50 is flat and made of glass material, for protecting the imaging sensor 60 against dust or contamination. The transparent plate 50 includes a seventh surface 52 and an opposite eighth surface 54. Either or both of the seventh surface 52 and the eighth surface 54 can be coated with an IR-Cut (Infrared-Cut) film in order to reduce or eliminate adverse effects that IR light may have on the imaging quality. The image sensor 60 is typically a CMOS (Complementary Metal-Oxide Semiconductor) sensor or a CCD (Charge Coupled Device) sensor. For the purpose of reducing costs, it is generally preferred to employ CMOS sensors in mobile phones. A half-length of an available diagonal of a preferred CMOS sensor represents a maximum image height, which is typically 2.88 mm (equal to 1.0 field). A center of the CMOS sensor represents a minimum image height, which is 0 mm (equal to 0 field). The preferred CMOS sensor is capable of achieving a resolution of 2 million pixels.

Figure 6:
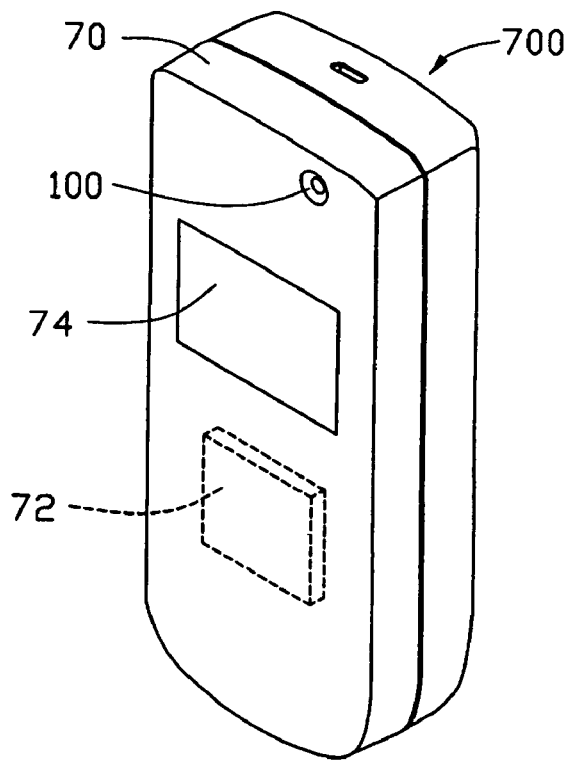
FIG. 6 is an isometric view of a mobile phone with the hybrid lens system of FIG. 1 incorporated therein.

The hybrid lens system 100 is constructed according to Tables 1 and 2 as follows:

shown in FIG. 6). In use of the hybrid lens system 100, the diaphragm 40 controls a quantity of incident light beams entering the hybrid lens system 100 from the object side. Entering light beams sequentially pass through the first, second and third lenses 10, 20 and 30, and through the transparent plate 50. The light beams are then incident on the imaging sensor 60.

Referring to FIG. 6, the mobile phone 700 further includes a housing 70, circuitry 72, and a display screen 74. The hybrid lens system 100, the circuitry 72 and the display screen 74 are integrated in the housing 70. The imaging sensor 60 converts the light beams into electric signals, and then transmits the electric signals to the circuitry 72. The circuitry 72 processes the electric signals and obtains digital image data 10 therefrom. Finally, the display screen 74

TABLE 1

| Surface | Radius of Curvature (mm) | Thickness (mm) | Separation (mm) | Diameter (mm) | Conic Coefficient (K) | Material |
|---|---|---|---|---|---|---|
| Object surface | Flat | | | 0 | 0 | |
| Diaphragm | Flat | | 0.03 | 1.75938 | 0 | |
| First surface 12 | 2.093107 | 1.138754 | | 2.137557 | 0 | Glass |
| Second surface 14 | −14.09185 | | 0.356845 | 2.219024 | 0 | Glass |
| Third surface 22 | −1.580299 | 0.5303483 | | 2.22887 | 0 | Plastic |
| Fourth surface 24 | −3.834692 | | 0.6672668 | 2.44962 | 0 | Plastic |
| Fifth surface 32 | 3.548128 | 1.676978 | | 3.376542 | 0 | Plastic |
| Sixth surface 34 | 4.507075 | | 0.8 | 4.782808 | 0 | Plastic |
| Seventh surface 52 | Flat | 0.55 | | 5.387982 | 0 | Glass |
| Eighth surface 54 | Flat | | 0.3553783 | 5.603578 | 0 | Glass |
| Image surface 60 | Flat | | | 5.86894 | 0 | |
| Total length | | | 6.10557 mm | | | |

In the hybrid lens system 100, the third and fourth surfaces 22, 24 of the second lens 20, and the fifth and sixth surfaces 32, 34 of the third lens 30 are aspheric, and are configured according to the following formula:

$$X(Y) = (Y^2/R)/(1+\sqrt{1-(1+K)*(Y/R)^2}) + A_4*Y^4 + A_6*Y^6 + A_8*Y^8 + A_{10}*Y^{10} + \ldots$$

wherein, X represents a horizontal length parallel to an optical axis O-I (see FIG. 1) from a point on a surface of the lens to an imaginary center line of the lens which is perpendicular to the optical axis O-I, Y represents a vertical height from the point on the surface of the lens to the optical axis O-I, K represents a conic coefficient, R represents a radius of curvature, and $A_4$, $A_6$, $A_8$, $A_{10}$ represent second-order, fourth-order, eighth-order and tenth-order aspheric coefficients respectively.

The aspheric coefficients ($A_4$, $A_6$, $A_8$, $A_{10}$) of the second and third lenses 20, 30 are defined in Table 2.

displays an image corresponding to the image data. The imaging sensor 60 of the hybrid lens system 100 is capable of achieving a resolution of 2 million pixels; therefore, the displayed image has high definition.

Figure 2:
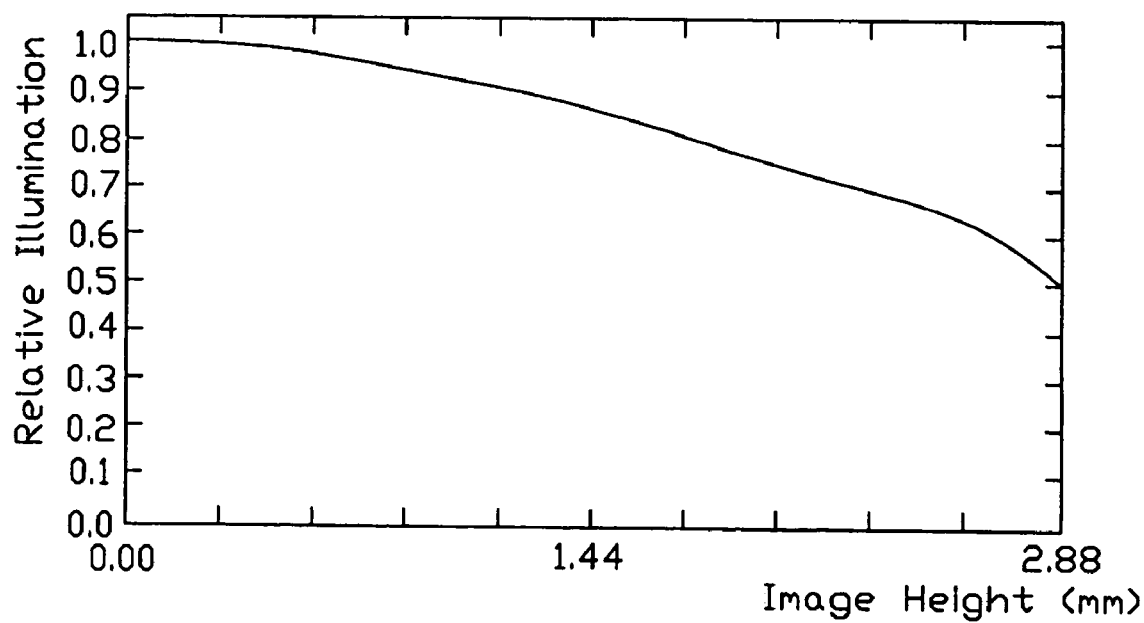
FIG. 2 is a graph showing a relative illumination curve of the hybrid lens system of FIG. 1.

FIGS. 2, 3, 4 and 5 are graphs relating to performance of the hybrid lens system 100. The various characteristics presented in the graphs indicate that the hybrid lens system 100 can provide images of good quality. FIG. 2 shows a relative illumination curve of the hybrid lens system 100. A wavelength of light used to obtain the data is 646 nm. At an edge of the image (i.e. where the abscissa value is 2.88 mm), the relative illumination value is no less than 0.5. The relative illumination value at the edge of an image is characteristically the minimum value of relative illumination for an optical system. Thus it can be concluded that the hybrid lens system 100 provides satisfactory relative illumination for the entire image.

TABLE 2

| | Surface | | | |
|---|---|---|---|---|
| Coefficient | Third surface 22 | Fourth surface 24 | Fifth surface 32 | Sixth surface 34 |
| $A_4$ | 0.13698319 | 0.077704334 | −0.056844061 | −0.030872481 |
| $A_6$ | 0.0030158839 | 0.012558739 | 0.0090166435 | 0.0020747848 |
| $A_8$ | −0.0069480768 | 0.0024161736 | −0.0017488191 | −0.00023674915 |
| $A_{10}$ | 0.00046831347 | −0.0014285921 | 8.0301293E−05 | −2.324356E−07 |

Figure 3:
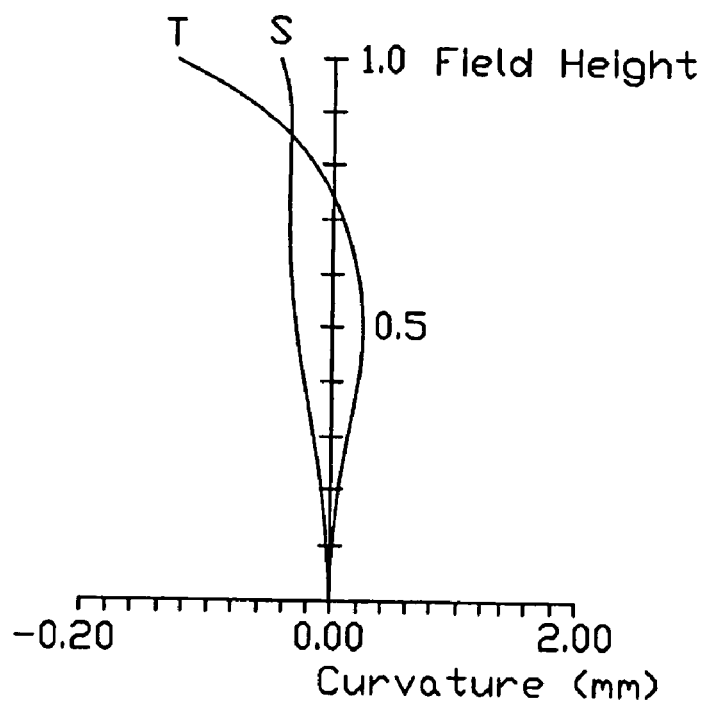
FIG. 3 is a graph showing field curvature curves of the hybrid lens system of FIG. 1.

Referring also to FIG. 1 and Table 1, the total length of the hybrid lens system 100 is only 6.10557 mm (viz. about 6.11 mm). That is, the hybrid lens system 100 is compact enough to be incorporated in an exemplary mobile phone 700 (as FIG. 3 shows field curvature curves of the hybrid lens system 100. A wavelength of light used to obtain the data is 546 nm. The two curves S and T respectively express the sagittal and tangential field curvatures which are obtained according to the abscissa value. Near the edge of the field (i.e. where the ordinate value is from 0.8 to 0.9 approximately), the sagittal and tangential field curvatures are less than 0.08 mm. The sagittal and tangential field curvatures characteristically have maximum values at the edge of the field. Thus it can be concluded that the hybrid lens system 100 satisfies general requirements of field curvatures.

Figure 4:
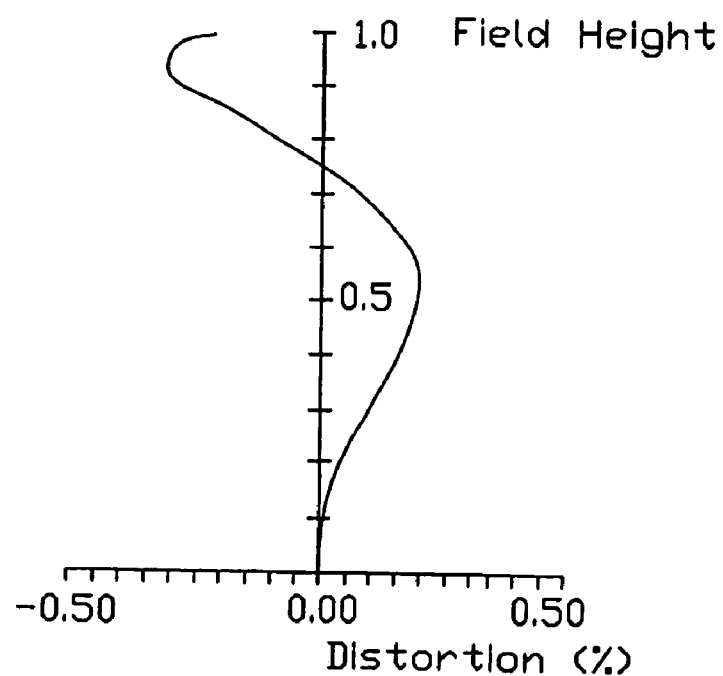
FIG. 4 is a graph showing a distortion curve of the hybrid lens system of FIG. 1.

FIG. 4 shows a distortion curve of the hybrid lens system 100. A wavelength of light used to obtain the data is 546 nm. The distortion value varies with the field height. From the center to the edge of the field (i.e. where the ordinate value ranges from 0 to 1.0 approximately), the distortion value is less than ±0.05%, which is far less than the usual threshold requirement of ±1%.

Figure 5:
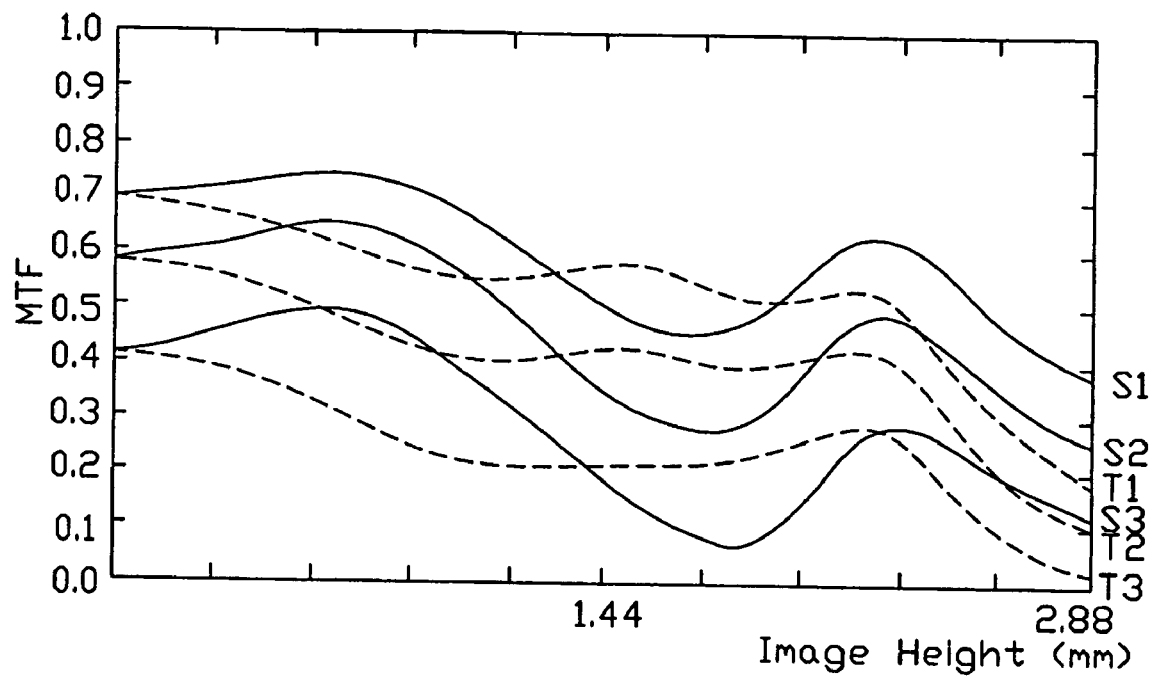
FIG. 5 is a graph showing MTF (Modular Transfer Function) curves of the hybrid lens system of FIG. 1.

FIG. 5 shows MTF curves of the hybrid lens system 100. Wavelengths of three light beams used to obtain the data are 460 nm, 546 nm, and 656 nm respectively. Spatial frequencies of the three light beams are sequentially 90 lp/mm (line pairs per mm), 120 lp/mm, and 180 lp/mm. In the graph, the three light beams are shown as three pairs of curves labeled as ($S_1$, $T_1$), ($S_2$, $T_2$) and ($S_3$, $T_3$) respectively. The MTF value varies with the spatial frequencies and the image height. Near the edge of the image (i.e. where the abscissa value is approximately 2.30 mm), the curves $S_1$, $T_1$ whose spatial frequencies are 90 lp/mm show that the sagittal and tangential MTF values are respectively greater than 50% and 40%. The curves $S_2$, $T_2$ whose spatial frequencies are 120 lp/mm show that the sagittal and tangential MTF values are respectively greater than 40% and 30%. The curves $S_3$, $T_3$ whose spatial frequencies are 180 lp/mm show that the sagittal and tangential MTF values are both greater than 20%. These data indicate that the hybrid lens system 100 satisfies the requirement of acutance.

Although the present invention has been described with reference to a specific embodiment, it should be noted that the described embodiment is by no means exhaustive. As such, various changes and modifications may be made to the described embodiment without departing from the scope of the invention as defined by the appended claims.

What is claimed is:

1. A hybrid lens system comprising, in order from an object side to an image side:
   a first positive lens made of glass material and comprising a first spherical surface and a second spherical surface, the first surface facing toward the object side and being convex, and the second surface facing toward the image side and being convex, wherein a refractive index N1 and a dispersion index V1 of the first lens respectively fulfill the following conditions: $0.55 \leq N1 \leq 0.65$ and $55 \leq V1 \leq 65$;
   a second negative lens made of plastic material and comprising a third aspheric surface and a fourth aspheric surface, the third surface facing toward the object side and being concave, the fourth surface facing toward the image side and being convex; and
   a third positive lens made of plastic material and comprising a fifth aspheric surface and a sixth aspheric surface, the fifth surface facing toward the object side and being convex, and the sixth surface facing toward the image side and being concave.

2. The hybrid lens system as described in claim 1, wherein a refractive index N2 and a dispersion index V2 of the second lens respectively fulfill the following conditions: $0.58 \leq N2 \leq 0.65$ and $25 \leq V2 \leq 35$.

3. The hybrid lens system as described in claim 2, wherein a refractive index N3 and a dispersion index V3 of the third lens respectively fulfill the following conditions: $0.49 \leq N3 \leq 0.56$ and $55 \leq V3 \leq 60$.

4. The hybrid lens system as described in claim 1, wherein at least one of the first and second surfaces is coated with an IR-Cut (Infrared-Cut) film.

5. The hybrid lens system as described in claim 4, further comprising a diaphragm, a transparent member for blocking dust or contamination, and an imaging sensor, the diaphragm being arranged at the object side of the first lens, the transparent member and the imaging sensor being sequentially arranged at the image side of the third lens.

6. The hybrid lens system as described in claim 5, wherein the transparent member is flat and has a seventh surface facing toward the third lens and an eighth surface facing toward the imaging sensor.

7. The hybrid lens system as described in claim 6, wherein the transparent member is made of glass, and at least one of the seventh and eight surfaces is coated with an IR-Cut film.

8. The hybrid lens system as described in claim 6, wherein the hybrid lens system is constructed according to the following parameters:

| Surface | Radius of Curvature (mm) | Thickness (mm) | Separation (mm) | Diameter (mm) | Conic Co-efficient (K) |
|---|---|---|---|---|---|
| Object surface | Flat | | | 0 | 0 |
| Diaphragm | Flat | | 0.03 | 1.75938 | 0 |
| First surface | 2.093107 | 1.138754 | | 2.137557 | 0 |
| Second surface | −14.09185 | | 0.356845 | 2.219024 | 0 |
| Third surface | −1.580299 | 0.5303483 | | 2.22887 | 0 |
| Fourth surface | −3.834692 | | 0.6672668 | 2.44962 | 0 |
| Fifth surface | 3.548128 | 1.676978 | | 3.376542 | 0 |
| Sixth surface | 4.507075 | | 0.8 | 4.782808 | 0 |
| Seventh surface | Flat | 0.55 | | 5.387982 | 0 |
| Eighth surface | Flat | | 0.3553783 | 5.603578 | 0 |
| Image surface | Flat | | | 5.86894 | 0 | and aspheric coefficients of the second and third lenses are:

| Coefficient | Surface | | | |
|---|---|---|---|---|
| | Third surface | Fourth surface | Fifth surface | Sixth surface |
| Second-order | 0.13698319 | 0.077704334 | −0.056844061 | −0.030872481 |
| Fourth-order | 0.0030158839 | 0.012558739 | 0.0090166435 | 0.0020747848 |
| Sixth-order | −0.0069480768 | 0.0024161736 | −0.0017488191 | −0.00023674915 |
| Eighth-order | 0.00046831347 | −0.0014285921 | 8.0301293E−05 | −2.324356E−07. |

9. A hybrid lens system comprising, in order from an object side to an image side:
- a first biconvex positive lens, where a refractive index $N1$ and a dispersion index $V1$ of the first lens respectively fulfill the following conditions: $0.55 \leq N1 \leq 0.65$ and $55 \leq V1 \leq 65$;
- a second negative lens made of plastic material having a meniscus shape with a concave surface on the object side; and
- a third positive lens made of plastic material having a meniscus shape with a convex surface on the object side;
- wherein the second negative lens and the third positive lens are aspheric on both surfaces thereof.

10. The hybrid lens system as described in claim 9, wherein the first lens is made of glass material.

11. The hybrid lens system as described in claim 9, wherein the first lens is spherical on both surfaces thereof.

12. The hybrid lens system as described in claim 9, wherein a refractive index $N2$ and a dispersion index $V2$ of the second lens respectively fulfill the following conditions: $0.58 \leq N2 \leq 0.65$ and $25 \leq V2 \leq 35$.

13. The hybrid lens system as described in claim 9, wherein a refractive index $N3$ and a dispersion index $V3$ of the third lens respectively fulfill the following conditions: $0.49 \leq N3 \leq 0.56$ and $55 \leq V3 \leq 60$.

* * * * *